Figure 4:
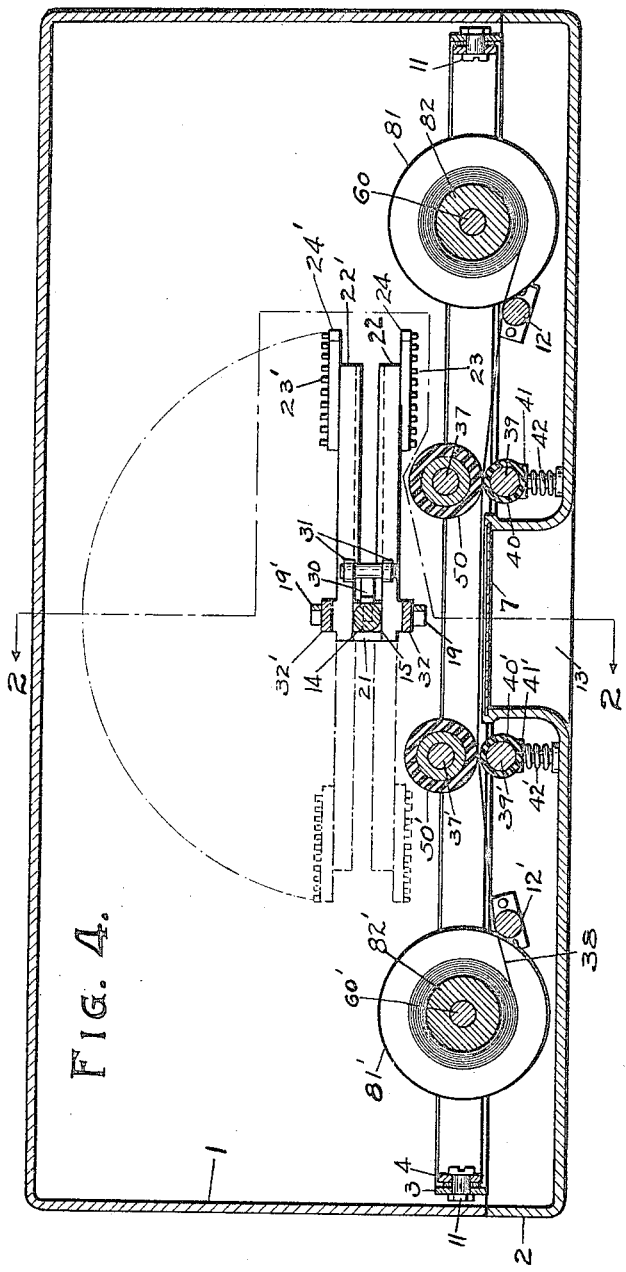

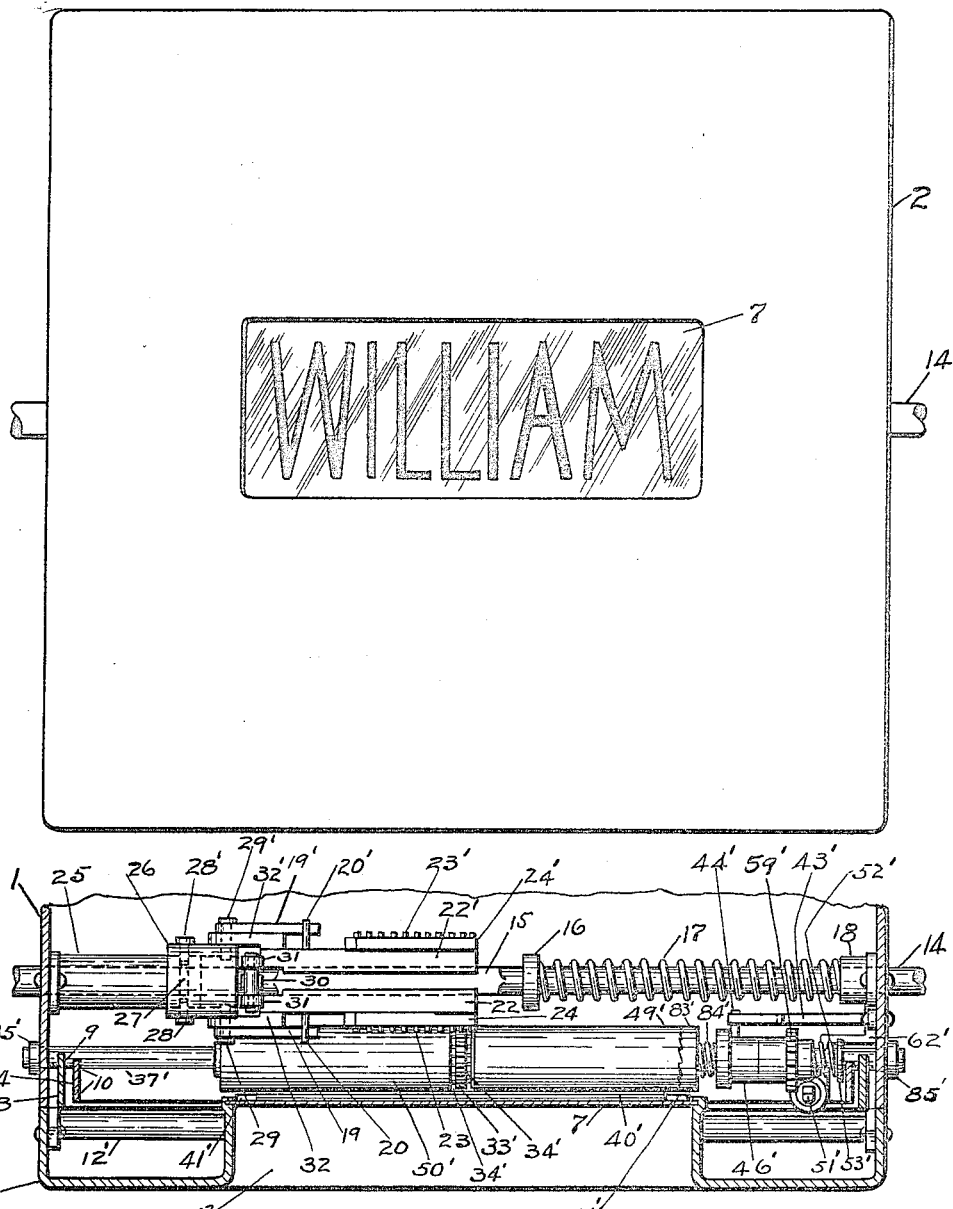

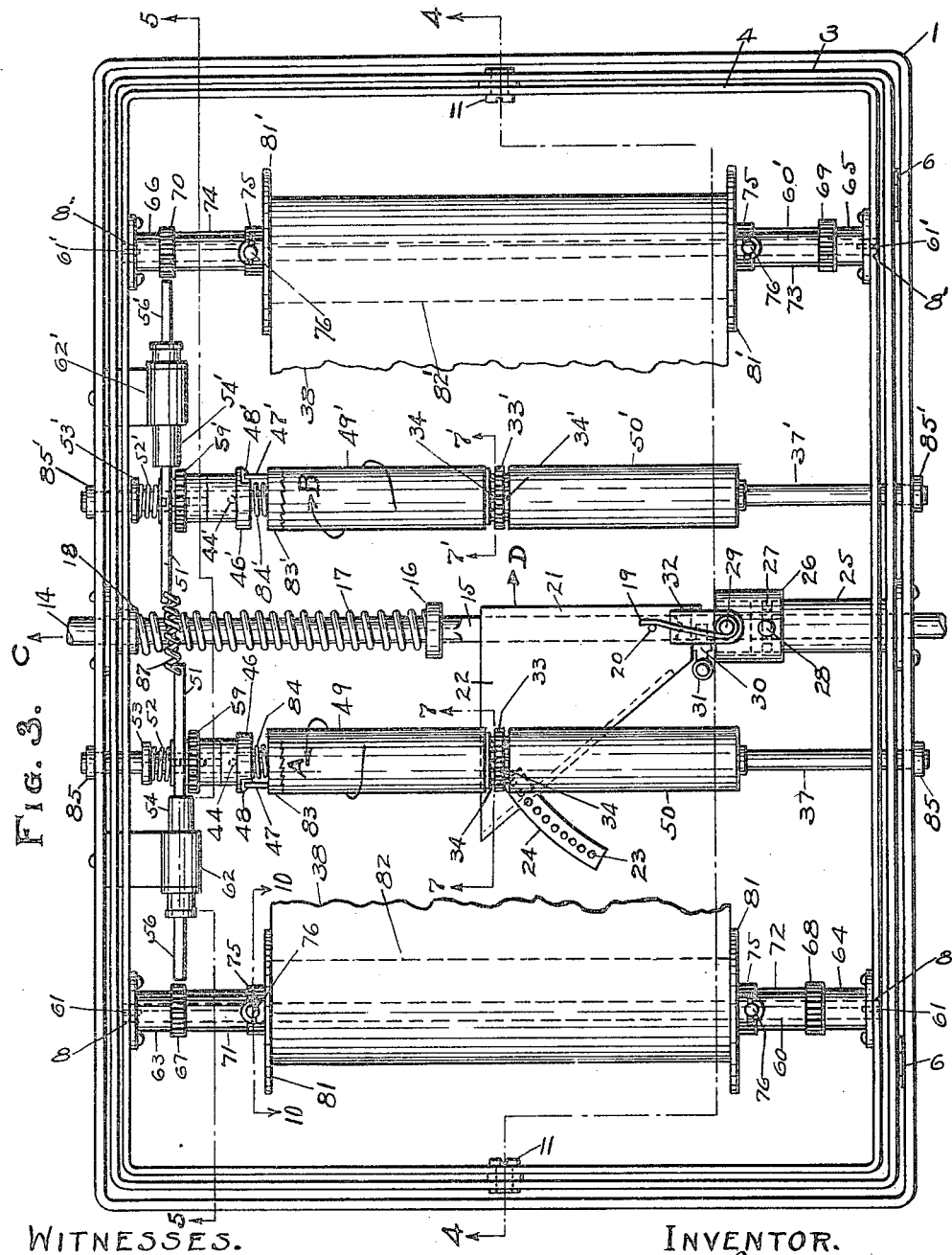

J. BIRD.
STREET INDICATOR.
APPLICATION FILED APR. 14, 1916.

1,225,214.

Patented May 8, 1917.
5 SHEETS—SHEET 3.

WITNESSES.
Horace E. Foot
Zita V. McBride

INVENTOR
James Bird
By Charles B. Winthrop
ATTORNEY.

J. BIRD.
STREET INDICATOR.
APPLICATION FILED APR. 14, 1916.

1,225,214.

Patented May 8, 1917.
5 SHEETS—SHEET 4.

J. BIRD.
STREET INDICATOR.
APPLICATION FILED APR. 14, 1916.
1,225,214.
Patented May 8, 1917.
5 SHEETS—SHEET 5.
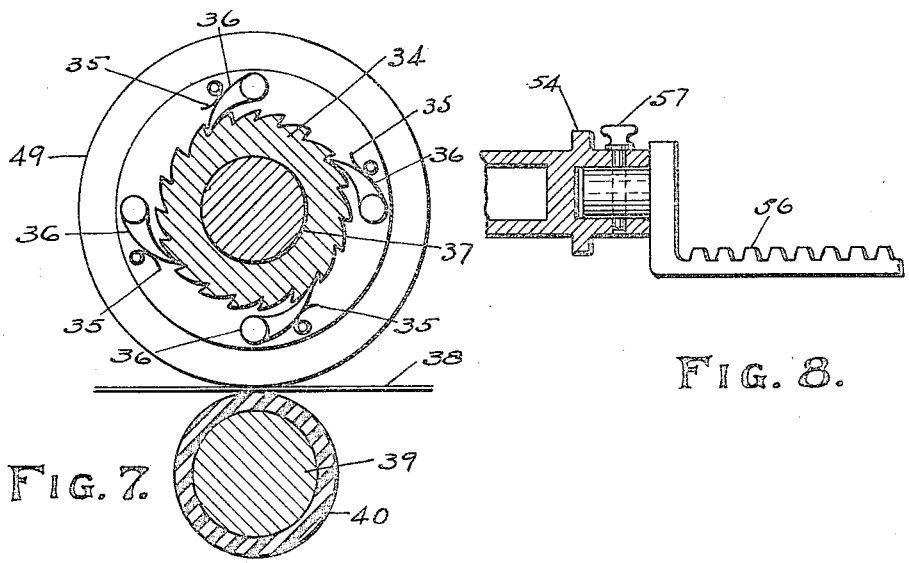
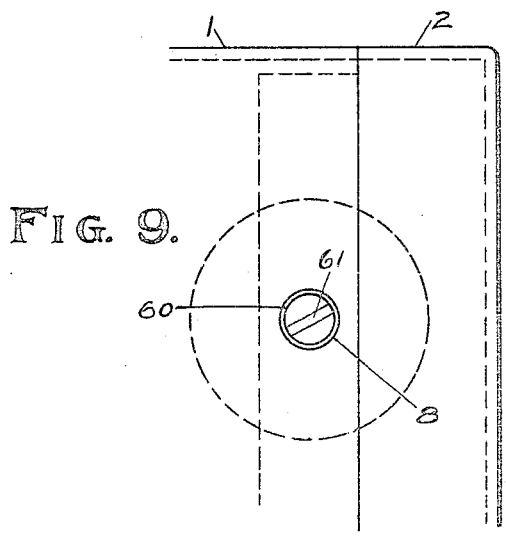
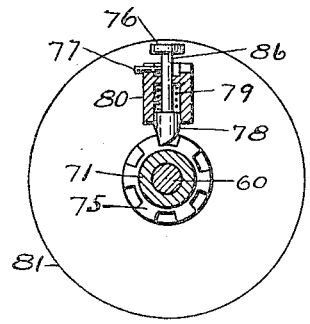
WITNESSES.
INVENTOR.
James Bird
BY
Charles B. Woulthrop
ATTORNEY.

UNITED STATES PATENT OFFICE.

JAMES BIRD, OF BUFFALO, NEW YORK.

STREET-INDICATOR.

1,225,214.      Specification of Letters Patent.      Patented May 8, 1917.

Application filed April 14, 1916. Serial No. 91,242.

*To all whom it may concern:*

Be it known that I, JAMES BIRD, a citizen of the United States, residing at Buffalo, in the county of Erie and State of New York, have invented certain new and useful Improvements in Street-Indicators.

My invention relates to mechanically operated street indicators for use on street cars or like conveyances.

One of the objects of the invention is to provide a simple and efficient means of indicating the names of streets so the passengers in a street car can see at a glance the name of the street which they are approaching.

To accomplish this object under all conditions a curtain is provided having names printed thereon, (on both sides when necessary) and means to move said curtain and indicate the streets from one end of a line to another; to indicate the streets in a reverse manner from the end of the line to the starting point; to indicate the streets from the end of the line to the starting point when a car returns partly or wholly by a route different from the one taken to go to the end of the line; and to indicate the streets to and from any portion of a line when a car makes an incomplete trip.

My indicator can also be used on steam cars to indicate the stations in a similar manner to the indication of streets for a street car.

One of the advantages secured by my improvement is the movement of the curtain, having the street names, an equal distance each time it is operated, so the names always register with the sight opening and this is accomplished by taking hold of and driving the curtain itself instead of driving a roller on which the curtain is wound. In the latter case the names cannot be placed at equally spaced distances on the curtain as the curtain will travel farther and farther for each rotation of the roller as the curtain becomes wound thereon.

Further objects and advantages are fully set forth in the accompanying specification and drawings and more particularly pointed out in the claims.

In the drawings Figure 1 is a front elevation of my improved street car indicator as it will look in the end of a street car and showing the name of a street as "William" through the sight opening.

Figure 5:
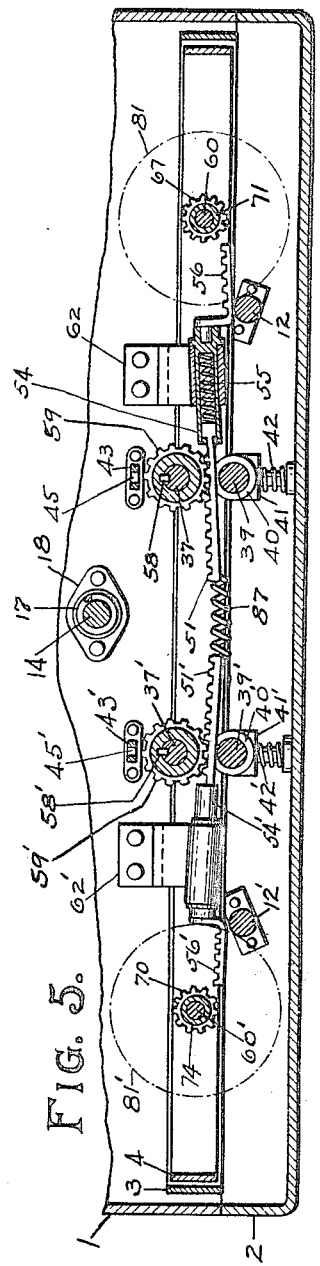
Figure 6:
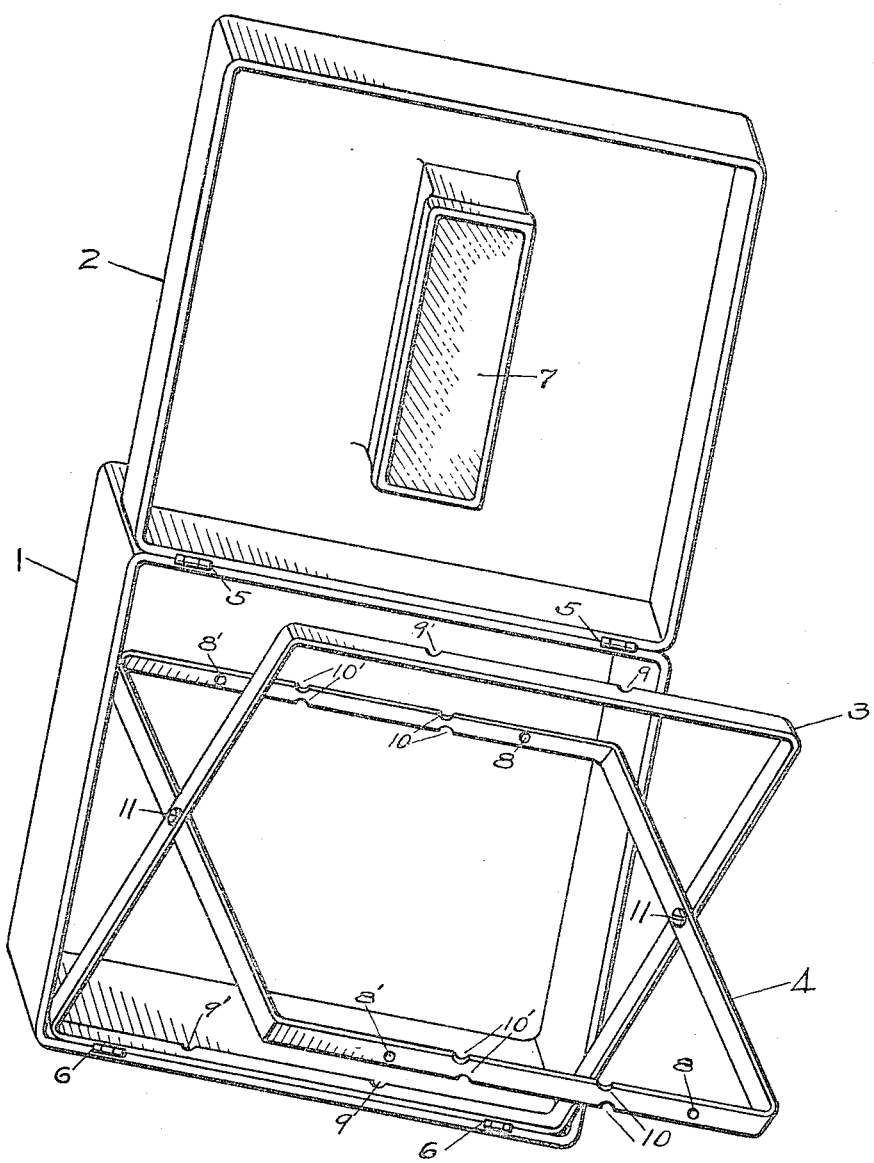

Fig. 2 is a partial section through the sight opening and as indicated by line 2—2 in Fig. 4. Fig. 3 is a view looking into my improved indicator and with the cover removed and the curtain partly removed. Fig. 4 is a section on the line 4—4 of Fig. 3. Fig. 5 is a partial section on the line 5—5 of Fig. 3. Fig. 6 is a view of my improved indicator with the cover open and the two frames drawn out to show the method of fastening and their operation. Fig. 7 is an enlarged view of the ratchet mechanism on the operating rollers shown on line 7—7 of Fig. 3. Fig. 8 is an enlarged view of one end of the rack for operating the storage rollers. Fig. 9 is an enlarged view of the ends of the storage roller showing a slot. Fig. 10 is an enlarged view of the section on line 10—10 of Fig. 3, and showing the ratchet mechanism for the storage rollers.

Referring to Figs. 1, 2 and 6, 1 is the box and 2 the cover of my improved street indicator. 3 is the outer and 4 the inner of two frames mounted in the box 1. The frame 3 is provided as a carrier of the frame 4 and is hinged to the box 1 by means of hinges 6, 6 which are opposite to the hinges 5, 5 of the box and cover, as a convenient means for swinging the frames 3 and 4 clear of the box 1 and the cover 2.

8, 8, $8^1$, $8^1$, are holes in frame 4 into which project the shafts 60, $60^1$ (see Fig. 3) which latter carries the storage rollers 82 and $82^1$. Curtain 38 (Fig. 3) is wound onto and stretched between storage rollers 82 and $82^1$ and can be reversed by means of the frames 3 and 4 being drawn out from the box 2 (Fig. 6) and the frame 4 being swung around on the pivots 11, 11, which fasten frames 3 and 4 together. 13 is a sight opening in the cover 2 and having a glass 7 through which the names of the street on the curtain 38 can be seen. 10, 10 and $10^1$, $10^1$ are slots cut in frame 4 and 9, 9 and $9^1$, $9^1$ are slots cut in frame 3 to clear shafts 37, $37^1$, upon which are fastened the operating rollers 49, 50 and $49^1$, $50^1$. The shafts 37, $37^1$ are rotatably mounted at each end in the box 1, and have collars 85, 85, and $85^1$, $85^1$ fastened thereon. 33 and $33^1$ are gears rotatably mounted on the shafts 37, $37^1$ between the rollers 49, 50 and $49^1$, $50^1$ and are connected with and operate said rollers by means of ratchet mechanism shown in detail in Fig. 7. This ratchet mechanism consists of a toothed wheel 34 fastened on each side of the gears 33 and 33¹ and engaged with the rollers 49, 50 and 49¹, 50¹ by means of dogs 36, 36, etc., and springs 35, 35, etc.

39, 39¹ are shafts (see Figs. 4 and 5) carrying rollers 40, 40¹ for pressing the curtain 38 tightly against operating rollers 49, 50 and 49¹, 50¹ by means of springs 42, 42 and 42¹, 42¹ pressing against bearings 41, 41 and 41¹, 41¹. The shafts, rollers, bearings and springs just mentioned are all mounted in the cover 2. Also in the cover 2 are mounted the shafts 12, 12¹ over which the curtain 38 is guided from the operating rollers 49, 50 and 49¹, 50¹ to the storage rollers 82, 82¹.

83, 83¹ are washers loosely mounted on shafts 37, 37¹ and having a toothed surface to engage with a like toothed surface on the ends of the rollers 49, 49¹. 84, 84¹ are springs on the shafts 37, 37¹ and between the washers 83, 83¹ and collars 46, 46¹ to keep the washers engaged with the shafts 49, 49¹ when the rollers move in the direction indicated by the arrows.

46, 46¹ (Fig. 3) are collars loosely mounted on the shafts 37 and 37¹ and have cams 48, 48¹ which engage with the pins 47, 47¹ which are mounted in the ends of the washers 83, 83¹. The collars 46 and 46¹ have only a longitudinal movement on the shafts 37, 37¹ by reason of pins 44, 44¹ operating in slots 45, 45¹ in guide 43, 43¹ as shown in Figs. 2, 3 and 5.

59, 59¹ are gears mounted on shafts 37, 37¹ and driven by the latter by means of the feathers 58, 58¹ (Fig. 5). 52, 52¹ are springs between the gears 59, 59¹ and the collars 53, 53¹ which are fastened on the shafts 37, 37¹. 51, 51¹ are racks to mesh with the gears 59, 59¹ and 87 is a spring fastened to 51 and 51¹ to hold them in normal position shown. 54, 54¹ are housings for carrying the racks 51, 51¹ and springs one of which 55 is shown. 62, 62¹ are brackets fastened to the box 1 and carry the housings 54, 54¹. 56 and 56¹ are racks to engage and operate gears 67 and 70 as shown in Fig. 3 and Fig. 5 and to operate gears 68 and 69 when the frame 4 carrying the rollers 82, 82¹ is reversed as shown in Fig. 6.

Racks 56, 56¹ are also reversible as shown by detail in Fig. 8 in which the pin 57 holds the rack 56 in position in one direction and can also be removed and replaced to hold the rack 56 in the reverse direction to that shown.

60, 60¹ are shafts on which the rollers 82, 82¹ are fastened and which are held stationary by friction in the bearings 63, 64 and 65, 66, except when operated by the rack and gear, said bearings being mounted in the frame 4.

The gear 67 is loosely mounted on the shaft 60 and has a hub 71 on which are cut ratchet teeth 75 on its inner end next to the flange 81 of roller 82. This gear 67 is connected to and operates the storage roller 82 by means of the ratchet mechanism shown in detail in Fig. 10, in which 60 is the shaft, 71 the gear hub, and 75 the ratchet teeth. 77 is a pin fastened into the shank 86 of the ratchet pin 78. 76 is a button on the end of shank 86. 79 is a spring for holding the ratchet pin 78 in operative position with the teeth 75. 80 is a boss on the flange 81 for holding the ratchet pin 78 and spring 79. The ratchet pin 78 has one side flat for engaging in the ratchet teeth 75 to drive the roller 82 when the gear 67 is moved in one direction by the rack 56, while it is beveled on the opposite side to allow the pin 78 to rise from the ratchet teeth, when the gear 67 is moved in the opposite direction by the rack 56. The pin 77 is in a slot in the boss 80 as shown and to reverse the direction which the gear 67 will move the roller 82, the ratchet pin 78 is reversed by reversing the pin 77.

The gear 68 has a hub 72 on which are cut ratchet teeth 75 on its inner end next to a second flange 81 of the roller 82. When the storage roller 82 is reversed the gear 68 is in a position to be operated by the rack 56, through the gear 68 and its ratchet teeth 75 and a ratchet mechanism shown in detail in Fig. 10.

In a similar manner the gear 69 has a hub 73 with ratchet teeth 75 and gear 70 has a hub 74 with ratchet teeth 75.

The gears 69 and 70 are connected to and operate the storage roller 82¹ through the flanges 81¹, 81¹ with the same ratchet mechanism as described and shown in detail in Fig. 10.

61, 61 and 61¹, 61¹ are slots in the ends of the shafts 60 and 60¹ for the purpose of inserting a screw driver or similar tool to revolve the shaft 60 or 60¹ independent of the action of the rack 56 or 56¹.

This slot is shown enlarged in Fig. 9.

In Figs. 2, 3 and 5—18 and 25 are bearings fastened to the box 1 and supporting the shaft 14. The shaft 14 extends through the box 1 and has suitable means attached to it (not shown) to draw it endwise through the box 1 and so compress the spring 17 which returns the shaft 14 to the position shown in Figs. 2 and 3 when released. 16 is a collar fastened on shaft 14 and against which the spring 17 bears. 15 is a square portion of the shaft 14 which acts as a guide for the two flat plates 22, 22¹ which rest against it. 21 is a distance piece between the plates 22, 22¹ and forms a stop for them against the shaft 14. 24 is a sector fastened to plate 22 and having pegs 23, 23, etc., which are adapted to mesh with the teeth of the gear 33. 24¹ is a sector fastened to the plate 22¹ and having pegs 23¹, 23¹, etc., which are adapted to mesh with the teeth of the gear 33¹ when the plates 22, 22¹ are moved 180° to the position as shown by the dotted lines in Fig. 4. 32, 32¹ are arms on the plates 22, 22¹ which span the collar 26 and are pivoted to it by the pivot pins 29, 29¹, which latter are solid in the collar 26. 19, 19¹ are springs, one of the ends of which are coiled around the pins 29, 29¹ and fastened solidly thereto and having their opposite ends pressing against the stop pegs 20, 20¹.

30 is a stud solidly fixed in the shaft 14 and having a cross piece on which are pivoted the two rollers 31, 31.

The bearing 25 has a slot 27 extending around it for the reception of the pins 28, 28¹, which hold the collar 26 in place on the bearing 25 and allow it to be revolved thereon.

The operation of the indicator is as follows—Assuming that the name of a street, as William, (see Fig. 1), is shown by the indicator, to move the curtain so the succeeding street name may show, the shaft 14 is pulled in the direction of the arrow C by suitable means attached to the shaft for that purpose (but not shown), and compresses the spring 17. The rollers 31, 31 then come in contact with the plates 22, 22¹ and move them on the pivot pins 29, 29¹ in the direction of the arrow D and against the springs 19, 19¹. This brings the pegs 23, 23, etc., into mesh with the teeth of the gear 33 and rotates the roller 49, 50, in the direction of the arrow A thereby drawing the curtain 38 from the roller 82¹, between the rollers 49¹, 50¹ and 40¹. As soon as the rollers 49, 50 commence to rotate the pin 47 acting on the cam 48 moves the collar 46 longitudinally on the shaft 37 (by reason of the pin 44 moving in slot 45 of guide 43) and against the gear 59 and slides it longitudinally on the shaft 37 and feather 58 until it is in mesh with the rack 51. The rollers 49, 50 continuing to rotate, the rack 51 is moved so the rack 56 meshes with the gear 67 and rotates the storage roller 82. This rotation of storage roller 82 winds the curtain 38 upon it as fast as it passes between the rollers 49, 50 and 40. The storage roller 82 being larger than the operating rollers 49, 50 and becoming larger at each rotation, as the curtain 38 is wound thereon, the rack 51 compresses the spring 55 and equalizes the amount of travel between the storage roller 82 and the operating rollers 49, 50. The shaft 14 is pulled out in the direction of the arrow C to a stop (not shown) so the movement of the curtain 38 is such that the name of a new street is in the proper position to be read through the glass 7 when the washer 83 has made a complete rotation. When the washer 83 has made a complete rotation the pin 47 is in the position shown in Fig. 3 and the spring 52 has just pushed the gear 59 out of mesh with the rack 51 allowing the spring 87 to return the racks 51 and 56 to the position shown. While the rack 56 is returning to the position shown in Fig. 3 the gear 67 is rotated fully on the shaft 60 and independent of the roller 82 by reason of the ratchet mechanism shown in detail in Fig. 10, and the roller 82 remains stationary by reason of the shaft 60 having a friction tight bearing in the bearings 63, 64.

The shaft 14 is released as soon as it reaches the stop (before mentioned) and is returned to the position shown in Fig. 3 by the spring 17 while the plates 22, 22¹ and sectors, 24, 24¹ are returned by the springs 19, 19¹. During this returning movement of the sectors 24, 24¹ the gear 33 rotates freely on the shaft 37, and the rollers 49, 50 remain stationary by reason of the ratchet mechanism shown in detail in Fig. 7. In like manner each street is shown by pulling the shaft 14 and letting it return to position shown in Fig. 3.

When the curtain has been completely rolled from storage roller 82¹ to storage roller 82, it is returned to the storage roller 82¹ (and the streets are shown in a reverse order) by moving the sectors 24 and 24¹ as shown by dotted lines in Fig. 4 so the pegs 23¹, 23¹, etc., mesh with the gear 33¹ on shaft 37.

This movement of the curtain 38 from roller 82¹ to 82 or vice versa can of course take place and hence the street names be shown, forward or backward from any point.

When it is desired to move the curtain 38 independently of the operation of the shaft 14, a key can be inserted in either of the slots 61, 61 of the shaft 60 or in 61¹, 61¹ of the shaft 60¹ and then rotate the shaft 61 or 61¹ until the proper street name is shown through the glass 7.

The back side of the curtain 38, (or the side which is shown in Fig. 4 as being away from the glass 7) may be provided with a set of street names so a car may return from the end of the line to the starting point by a different route. The latter street names may be put into position to be shown by opening the box 1 and swinging out the frames 3 and 4 and reversing frame 4, which carries the storage rollers 82 and 82¹ and the curtain 38, and replacing the frames 3 and 4.

The desired movement of rollers 82, 82¹ can then be obtained by reversing the racks 56, 56¹ (see Fig. 8) as they will then operate the gears 68 and 69.

Having thus described my invention I claim:

1. In a car indicator for streets, the combination of a box, a curtain in said box, a shaft in said box, a storage roller on said shaft and having said curtain attached thereto, a second shaft and an operating roller on said second shaft which is adapted to move said curtain by frictional contact therewith, means to operate said operating roller, a pinion on said storage roller shaft and a rack to mesh with said pinion and adapted to operate said storage roller and wind said curtain thereon, a second rack operatively connected to said first rack and a pinion on said operating roller shaft normally held out of contact with said second rack and adapted to mesh with and operate said second rack when said operating roller is moving said curtain.

2. In a car indicator for streets, the combination of a box, a curtain having the names of streets thereon, two storage rollers to which are attached, and upon which are wound said curtain, two operating rollers, the first of which is adapted to move said curtain from the first storage roller to the second storage roller and the second of which is adapted to move said curtain from the second storage roller to the first storage roller, reversible means to operate said operating rollers alternatively, means for operating said storage rollers from said operating rollers, said means consisting of racks and pinions, which are normally held out of mesh with each other and adapted to be brought into mesh with each other by movement of the operating roller.

3. In a car indicator for streets, the combination, of a box, a sight opening in said box, a curtain in said box having the names of streets on both sides thereof, a storage roller in said box to which said curtain is attached, an operating roller in said box adapted to move said curtain by frictional contact therewith, means to reverse said storage roller whereby the names on either side of said curtain may be shown through said sight opening, means to rotate said operating roller to show the names of said streets successively, and means between said operating roller and said storage roller to rotate said storage roller and store said curtain when in the original or reverse position, said latter means consisting of pinions connected to said operating and storage rollers and two racks yieldingly connected to each other and adapted to be brought into and out of mesh with said pinions, and one of said racks adapted to be reversed.

4. In a car indicator for streets, the combination of a box, a sight opening in said box, an operating roller journaled in said box, two frames in said box which are pivotally connected, and the outer of which is hinged to said box, two storage rollers fastened to the inner one of said frames, a curtain on said storage rollers and having the names of streets on both sides thereof and means to operate said operating roller whereby the names on both sides of said curtain may be successively shown through said sight opening.

5. In a car indicator for streets, the combination, of a box, a sight opening in said box, a curtain having the names of streets thereon, a storage roller to which said curtain is attached, an operating roller adapted to move said curtain across said sight opening toward said storage roller, means to operate said operating roller and means to rotate said storage roller from said operating roller, said latter means consisting of a pinion connected to said storage roller by a ratchet mechanism, a rack adapted to mesh with and rotate said pinion, a second pinion connected to said operating roller through a ratchet mechanism, a second rack yieldingly connected to said first rack and means to throw said second pinion into and out of mesh with said second rack.

6. In a car indicator for streets, a box, a cover for said box having a sight opening, two operating rollers journaled in said box, two frames in said box which are pivotally connected and the outer of which is hinged to said box, two storage rollers journaled to the inner one of said frames, a curtain on said storage rollers and having the names of streets thereon, means to hold said curtain in contact with said operating rollers, gears on said operating rollers, plates to which are attached two sectors having pegs to mesh with said gears and rotate said operating rollers alternatively, and a second set of gears on said operating rollers to operate said storage rollers by means of racks and gears on said storage rollers.

In testimony whereof, I have signed my name to this specification in the presence of two subscribing witnesses.

JAMES BIRD.

Witnesses:
 EDWARD GRAM,
 EDWARD C. CALLANAN.

Copies of this patent may be obtained for five cents each, by addressing the "Commissioner of Patents, Washington, D. C."